(12) United States Patent
De Bruijn

(10) Patent No.: US 9,909,863 B2
(45) Date of Patent: Mar. 6, 2018

(54) DETERMINATION OF A ROOM DIMENSION ESTIMATE

(71) Applicant: KONINKLIJKE PHILIPS N.V., Eindhoven (NL)

(72) Inventor: Werner Paulus Josephus De Bruijn, Utrecht (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 92 days.

(21) Appl. No.: 14/786,197

(22) PCT Filed: Apr. 24, 2014

(86) PCT No.: PCT/EP2014/058362
§ 371 (c)(1),
(2) Date: Oct. 22, 2015

(87) PCT Pub. No.: WO2014/183970
PCT Pub. Date: Nov. 20, 2014

(65) Prior Publication Data
US 2016/0061597 A1    Mar. 3, 2016

(30) Foreign Application Priority Data
May 16, 2013 (EP) ..................................... 13167971

(51) Int. Cl.
*G01B 17/00* (2006.01)
*G01H 7/00* (2006.01)
*H04S 7/00* (2006.01)

(52) U.S. Cl.
CPC ............... *G01B 17/00* (2013.01); *G01H 7/00* (2013.01); *H04S 7/301* (2013.01); *H04S 7/305* (2013.01)

(58) Field of Classification Search
CPC ......... G01B 17/00; H04S 7/301; H04S 7/305; G01H 7/00
See application file for complete search history.

(56) References Cited

U.S. PATENT DOCUMENTS

| 4,890,266 A | 12/1989 | Woodward |
| 2009/0010443 A1 | 1/2009 | Ahnert et al. |
| 2012/0288124 A1* | 11/2012 | Fejzo ...................... H04R 5/02 381/303 |

FOREIGN PATENT DOCUMENTS

| EP | 2261616 A1 | 12/2010 |
| JP | 0262992 A | 3/1990 |

(Continued)

OTHER PUBLICATIONS

Kuster, "Reliability of Estimating the Room volume From a Single Room Impulse Response", Journal Acoust. Soc. Am., vol. 124, No. 2, Aug. 2008, pp. 982-993.

(Continued)

*Primary Examiner* — Hovhannes Baghdasaryan

(57) ABSTRACT

An apparatus for determining a room dimension estimate including a receiver providing an acoustic room response, a peak detector detects a set of peaks in the acoustic room response in a frequency interval having an upper frequency of no more than 400 Hz, a store includes a set of peak profiles with associated room dimension data, and an estimator determines the room dimension estimate from the associated room dimension data and a comparison of the set of peaks to the peak profiles. The estimator may perform the steps of first finding a matching peak profile for the set of peaks from the set of peak profiles; extracting first room dimension data associated with the matching peak profile(s) from the store; and determining the room dimension esti- (Continued)

mate in response to the first room dimension data. The peak profiles may represent calculated Eigenfrequencies.

16 Claims, 4 Drawing Sheets

(56) References Cited

FOREIGN PATENT DOCUMENTS

| | | |
|---|---|---|
| JP | 07146127 A | 6/1995 |
| JP | 2004101343 A | 4/2004 |
| JP | 2005337848 A | 12/2005 |
| JP | 2007309838 A | 11/2007 |
| JP | 2007310758 A | 11/2007 |
| WO | 2004097350 A2 | 11/2004 |
| WO | 2007028094 A1 | 3/2007 |
| WO | 2008147513 A1 | 12/2008 |
| WO | 2011145030 A1 | 11/2011 |
| WO | 2012093352 A1 | 7/2012 |

OTHER PUBLICATIONS

Roper, "A Room Acoustics Measurement System Using Non-Invasive Microphone Arrays", Thesis, University of Birmingham, 2009, 275 Pages.

\* cited by examiner

DETERMINATION OF A ROOM DIMENSION ESTIMATE

CROSS-REFERENCE TO PRIOR APPLICATIONS

This application is the U.S. National Phase application under 35 U.S.C. § 371 of International Application No. PCT/EP2014/058362, filed on Apr. 24, 2014, which claims the benefit European Patent Application No. 13167971.4, filed on May 16, 2013. These applications are hereby incorporated by reference herein.

FIELD OF THE INVENTION

The invention relates to determination of a room dimension estimate and in particular, but not exclusively, to determination of combined length, width and height dimensions for a room.

BACKGROUND OF THE INVENTION

There are many applications in which it is beneficial to know the dimensions of a room. An obvious example is in sound reproduction, where the room has a very large influence on the sound that is experienced by the user. Knowing the shape and dimensions of the room provides important information that can be used to optimize the sound reproduction for that particular room. For example, knowing the room dimensions enables prediction of important acoustical properties of the room, such as its low-frequency room modes (causing resonances at specific frequencies, leading to an unpleasant "boomy" bass sound), early reflection patterns, reverberation time, etc. Knowing these acoustical properties enables processing of loudspeaker signals in such a way that the sound experience in the room is optimized. Furthermore, knowing the room dimensions enables provision of specific advice to the user of a multi-speaker system on how to best set up the loudspeaker system.

Also, outside sound reproduction, there are many applications that benefit from knowing the room dimensions, e.g. any application in which knowledge about the user's context is used to optimize a user experience.

Although it is of course possible to manually measure room dimensions and entering them into a device, this is cumbersome and often impractical.

Visual methods exist that are able to provide some indication of room lay-out. These are typically based on still or moving image cameras. However, although some information can be obtained by such approaches, they tend to be limited by the viewing angle of the camera and are hindered by objects that are blocking the camera's view as well as varying lighting conditions. In addition they often require additional or dedicated equipment (such as the camera) and may require specific positioning of the camera which can be inconvenient.

Another possibility for at least partially automated room dimension estimation is to determine estimates based on acoustic measurements in a room. This may be particularly attractive for sound rendering applications where the audio rendering system may also comprise functionality for estimating the room dimensions Various methods for acoustic room dimension estimation are known but these tend to be suboptimal, and in particular tend to be cumbersome, complex, and/or inaccurate. For example, acoustic methods are known that can generate an estimation of room volume by measuring reverberation time. However, this only results in a coarse indication of the overall room size (e.g. small, medium, large) and is not able to provide estimates of the individual dimensions.

Hence, an improved approach for determining a room dimension would be advantageous and in particular an approach allowing increased flexibility, facilitated operation, reduced complexity, reduced resource consumption, improved estimation accuracy and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for determining a room dimension estimate, the apparatus comprising: a receiver for providing an acoustic room response; a peak detector for detecting a set of peaks in the acoustic room response in a frequency interval, the frequency interval having an upper frequency of no more than 400 Hz; a store for storing a set of peak profiles with associated room dimension data; an estimator for determining the room dimension estimate in response to the associated room dimension data and a comparison of the set of peaks to the set of peak profiles.

The invention may allow improved and/or facilitated determination of a room dimension estimate. In particular, the approach may in many embodiments provide a more accurate room dimension estimate and/or more detailed data. Specifically, the approach may differentiate between room dimension data in different directions and is not limited to e.g. provide an estimate of the size or volume of the room. In particular, the approach allows determination of individual one-dimensional distance estimates, and in particular may characterize a room by a plurality of such individual one-dimensional distance estimates. For example, the length and width, or length, width and height, may be individually estimated for a room. Thus, a substantial improvement in the characterization of a room can be achieved.

The approach may allow for low complexity room estimation and is not reliant on complex or accurate formulas for calculating the room characteristics from room responses. The approach may automatically take into account variations in room characteristics and is typically not sensitive to such acoustic variations. For example, the approach may be used in rooms with different reverberation characteristics and may automatically adapt without requiring any input or knowledge of the specific characteristics except for the acoustic room response.

The generated room dimension estimate may be used to adapt the signal processing of an audio rendering system. The approach may thus result in improved audio quality of the rendered sound.

The Inventor has had the insight that a room dimension can be estimated from characteristics of peaks in a low frequency interval of an acoustic room response. In particular, the Inventor has realized that the peak characteristics at low frequencies reflect Eigenfrequencies of the room and that these are indicative of the room dimensions. The specific approach may exploit these insights to provide improved estimation for room dimensions The set of peak profiles may comprise a potentially large number of peak profiles corresponding to acoustic room responses of rooms with different dimensions and/or characteristics. Each peak profile may provide an indication of a distribution of peaks in an acoustic room response. The peak profiles may reflect characteristics of measured acoustic room responses. The peak profiles may reflect theoretically derived values, e.g. based on calculations of Eigenfrequencies for rooms with given dimensions. The peak profiles may be limited to a low frequency interval.

The store/memory may store a set of room dimension data for each peak profile. The room dimension data for a given peak profile may comprise at least one dimension value for the room corresponding to the acoustic room response represented by the peak profile. Specifically, the store may comprise a plurality of room data sets where each data set corresponds to a different room. Each room data set comprises a peak profile and associated room dimension data. The peak profile may reflect a peak distribution for an acoustic room response for that room. The associated room dimension data may comprise a set of one-dimensional distance values for the room. Specifically, the associated room dimension data may comprise a set of one-dimensional values for different directions (e.g. width, length and height) of the room.

The set of peaks may be compared to each peak profile of the set of peak profiles. The comparison may reflect how closely the peak distribution of the set of peak profiles matches the peak distribution indicated by the peak profile.

In some embodiments, the frequency interval may advantageously have an upper frequency of no more than 300 Hz; 200 Hz or even 100 Hz.

In accordance with an optional feature of the invention, the estimator comprises: a searcher for finding at least one matching peak profile for the set of peaks from the set of peak profiles; an extractor for extracting first room dimension data associated with the at least one matching peak profile from the store; and an estimate generator for determining the room dimension estimate in response to the first room dimension data.

This may provide improved estimation in many scenarios and/or may allow facilitated operation and implementation. In particular, it may allow a relatively low complexity algorithm to be used to generate accurate dimension estimates. The matching peak profile(s) may be the profile that is(are) considered to most closely match the set of peaks. In some embodiments, the apparatus may identify a plurality of matching profiles and room dimension data associated with this plurality of matching profiles may be used to generate the room dimension estimate.

In accordance with an optional feature of the invention, each peak profile comprises a set of frequencies of peaks.

This may provide high performance and/or facilitated implementation and operation. In particular, it may allow an efficient representation of the peak distribution information which is highly suitable for the processing to generate the room estimates.

In accordance with an optional feature of the invention, the searcher is arranged to determine a distance measure for each peak profile in response to a comparison of frequencies of the set of peaks and the set of frequencies of the peak profile; and to select the matching peak profile in response to the distance measures.

This may provide an efficient operation and/or provide more accurate estimates. In particular, it may allow a comparison and identification of one or more matching profiles which is particularly suitable for room estimation. The distance measure may for example be an accumulated value of the differences between the individual peaks of the set of peaks and the closest peak of the peak profile.

In accordance with an optional feature of the invention, each peak profile comprises a set of probability values, each probability value indicating a probability of a peak being measured in a frequency interval.

This may provide high performance and/or facilitated implementation and operation. In particular, it may allow an efficient representation of the peak distribution information which is highly suitable for the processing to generate the room dimension estimate.

In accordance with an optional feature of the invention, the searcher is arranged to determine a likelihood measure for each peak profile in response to the probability values of the peak profile and the frequencies of the set of peaks; and to select the matching peak profile in response to the likelihood measures.

This may provide an efficient operation and/or provide accurate estimates. In particular, it may allow a comparison and identification of one or more matching profiles which is particularly suitable for room dimension estimation. The likelihood measure may for example be an accumulated value of the probability values for the individual peaks of the set of peaks.

In accordance with an optional feature of the invention, each peak profile comprises a set of Eigenfrequencies calculated for a room and the associated room dimension data comprises an indication of dimensions for the room used to calculate the Eigenfrequencies.

This may provide efficient room dimension estimation and may in many scenarios facilitate implementation. For example, it may obviate or reduce the need for cumbersome and resource demanding measurements and data collection in order to populate the store. In many scenarios, improved results can be achieved as noise and error associated with measured acoustic room responses can be avoided for the stored peak profiles.

In accordance with an optional feature of the invention, the associated room dimension for at least some of the peak profiles comprises at least one one-dimensional value, and the estimator is arranged to generate the room dimension estimate to comprise at least one one-dimensional value.

The approach is not restricted to an overall size or volume estimate as is typical for many prior art approaches. Rather, individual one-dimensional measures can be generated. In some embodiments, the room dimension estimate may for example comprise one, two or three one-dimensional length values. For example, the room dimension estimate may comprise individual length and width estimates, or length, width and height estimates.

In accordance with an optional feature of the invention, the estimator is arranged to generate a match indication for the set of peaks and each peak profile of the set of profiles; and to generate the dimension estimate by a weighted combination of the associated room dimension data; the weight for associated room dimension data for a first peak profile of the set of peak profiles depending on the match indication for the first peak profile.

The feature may provide improved estimation in many scenarios. In particular, it may provide more accurate estimates in many scenarios by providing a more flexible averaging or combination of contributions from characteristics associated with different candidate rooms. In particular, the approach may reduce sensitivity to noise.

In accordance with an optional feature of the invention, the associated room dimension for at least some of the peak profiles comprises a plurality of one-dimensional values corresponding to different directions, and the estimator is arranged to determine averaged match indications for a subset of the directions in response to an averaging of match indications for the peak profiles over at least one direction not in the subset; and to determine one-dimensional room dimension estimates for the directions of the subset in response to the averaged match indications.

The feature may provide improved estimation in many scenarios.

In accordance with an optional feature of the invention, the receiver is arranged to receive a plurality of acoustic room responses corresponding to different positions of at least one of a sound source and a microphone; and the apparatus is arranged to perform a combination for the plurality of acoustic room responses.

This may allow more accurate estimates to be provided. In particular, the approach may provide additional data that allows improved estimation. In particular, the approach may allow a larger number of Eigenfrequencies of the room to be measured and detected.

In some embodiments, the averaging may be an averaging (low pass filtering) of the acoustic room responses for different positions.

In accordance with an optional feature of the invention, the combination includes at least one of an averaging of comparisons between sets of peaks corresponding to different acoustic room responses and the set of peak profiles and an averaging of room dimension estimates determined for different acoustic room responses.

This may provide improved estimates in many scenarios.

In accordance with an optional feature of the invention, the combination comprises generating the set of peaks by including peaks from more than one of the plurality of acoustic room responses.

This may provide improved estimates in many scenarios.

In accordance with an optional feature of the invention, the estimator may be arranged to select a subset of the set of peak profiles for the comparison in response to a user input indicating a room dimension value.

This may improve the room dimension estimation and/or facilitated operation.

In accordance with an optional feature of the invention, the estimator is arranged to weigh at least one of different peaks of the set of peaks and different peaks of a peak profile differently when performing the comparison.

This may improve the room dimension estimation and/or facilitated operation.

According to an aspect of the invention there is provided a method of determining a room dimension estimate, the method comprising: providing an acoustic room response; detecting a set of peaks in the acoustic room response in a frequency interval, the frequency interval having an upper frequency of no more than 400 Hz; providing a set of peak profiles with associated room dimension data; and determining the room dimension estimate in response to the associated room dimension data and a comparison of the set of peaks to the set of peak profiles.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
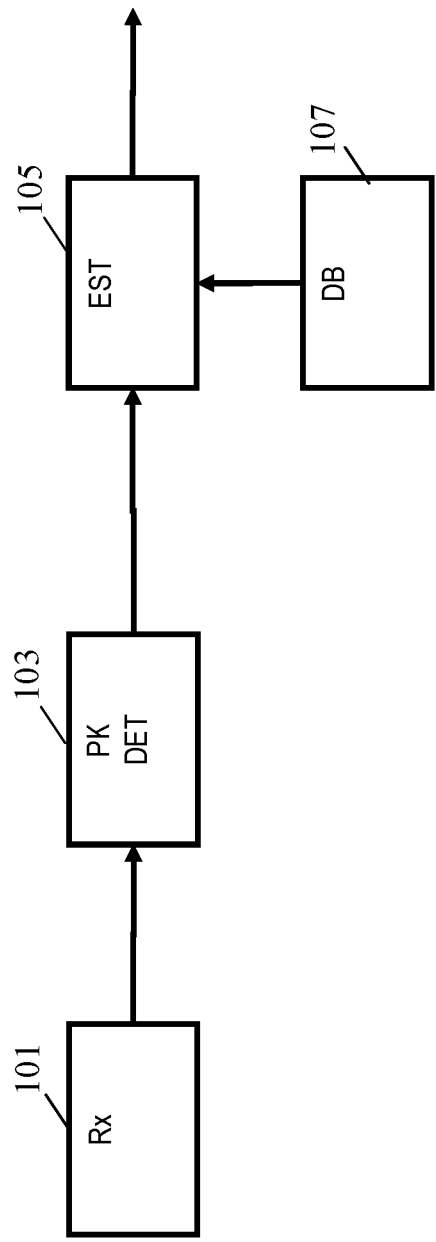
FIG. 1 illustrates an example of elements of an apparatus for determining a room dimension estimate in accordance with some embodiments of the invention.

FIG. 1 illustrates an example of an apparatus for determining a room dimension estimate, such as specifically a set of one-dimensional room dimensions, e.g. a width, length and height of a room.

The apparatus estimates the dimensions of a room based on a measured low-frequency acoustical response of the room in one or more positions. The apparatus detects peak frequencies in the measured acoustical room response(s), and compares the detected peak frequencies to a set of peak profiles stored in a database where each peak profile corresponds to the low frequency acoustic room response for a given room. Thus, each peak profile is associated with a set of room dimensions corresponding to the room for which the peak profile was determined. The system generates the estimates for the current room based on the comparisons and the associated room dimension data. For example, the peak profile most closely matching the detected set of peaks is identified and the room dimension data stored for this identified peak profile is extracted and used as the dimension estimates for the current room. Thus, the current room dimensions may be considered to correspond to the stored dimensions for the peak profile that most closely matches the detected peaks.

The approach exploits the insight that the sound field in any room is built up from a discrete set of Eigen modes, which are the solutions to the acoustical wave equation for that room, and that these can be used to estimate room dimensions. Each of the Eigen modes has a corresponding Eigenfrequency (also often referred to as a modal- or natural frequency). For a rectangular room with hard walls, these Eigenfrequencies can be given by (ref e.g. Heinrich Kuttruff, Room Acoustics (Second Edition), Applied Science Publishers, 1979, ISBN-10: 0853348138, ISBN-13: 9780853348139:

$$f_{n_x,n_y,n_z} = \frac{c}{2}\sqrt{\left(\frac{n_x}{L_x}\right)^2 + \left(\frac{n_y}{L_y}\right)^2 + \left(\frac{n_z}{L_z}\right)^2}, \quad (1)$$

in which $L_x$, $L_y$ and $L_z$ are the room dimensions in, respectively, the x-, y- and z-dimension, c is the speed of sound, and $n_x$, $n_y$ and $n_z$ are integers $\geq 0$ known as the mode indices in the x-, y-, and z-dimension.

The total acoustic room response can be modeled using the well-known "modal decomposition model", which computes the total response p at a receiver position $\vec{r}$; and frequency $\omega$, for a given position of the sound source $\vec{r}_0$:

$$p(\vec{r}, \omega) \propto j\omega \sum_n \frac{p_n(\vec{r})p_n(\vec{r}_0)}{(\omega^2 - \omega_n^2 - 2j\delta_n\omega_n)K_n}, \quad (2)$$

in which $p_n$ are the Eigen functions of the room, $\omega_n$ are the corresponding Eigenfrequencies (which for a rectangular room follow from equation (1)), $K_n$ is a scalar that depends on the mode type and $\delta_n$ is a damping factor which enables inclusion of some modest absorption in the model.

For a rectangular room the Eigen functions $p_n$ in equation (2) are given by:

$$p_n(\vec{r}) = \cos\left(\frac{n_x \pi x}{L_x}\right)\cos\left(\frac{n_y \pi y}{L_y}\right)\cos\left(\frac{n_z \pi z}{L_z}\right). \quad (3)$$

In a typical room there exist an infinity of Eigen modes and indeed the individual Eigen modes are generally considered to be inseparable and to effectively form a continuum, in which the individual Eigen modes cannot be distinguished in the room's frequency response. However, the current approach exploits the insight that at low frequencies, the Eigenfrequencies are typically spaced sufficiently far apart to allow individual Eigenfrequencies to be identified. The approach furthermore exploits the insight that the characteristics of these individual Eigenfrequencies can be used as a fingerprint or signature for the room response and thus the room, and that they can be used to identify rooms with similar room dimensions. Furthermore, the system can exploit the insight that this identification can be used to provide individual one-dimensional (length) estimates for different directions in the room. Specifically, individual estimates for the length, width and height of the room can be generated based on the peak signature for the room. Thus, in contrast to conventional approaches which typically can only provide estimates of the overall size or volume of the room, the current approach can provide estimates of the individual one-dimensional characteristics.

Indeed, the approach exploits the insight that each room size (specifically in terms of the length, width and height) corresponds to a more or less unique set of Eigenfrequencies. Two rooms that share one or two dimensions (e.g. have the same length and/or height) will have some common Eigenfrequencies in their respective sets, but will also have some that are different.

The apparatus of FIG. 1 comprises a receiver 101 which receives/provides an acoustic room response. The acoustic room response is a measured acoustic room response and may specifically be an acoustic room response measured by the apparatus of FIG. 1 itself. The acoustic room response may specifically represent the frequency-domain transfer function between a loudspeaker emitting an acoustical test signal and a microphone receiving the acoustical test signal in a room. This frequency-domain transfer function may be obtained directly from measuring the amplitude at the microphone position to individual narrow-band test signals, or from measuring a time-domain impulse response and transforming this to the frequency domain, or may be obtained any other suitable way known to a skilled person.

It will be appreciated that many different approaches and techniques are known for determining an acoustic room response including for example logarithmic sweeps, MLS signals, etc. In some embodiments, the receiver 101 may include an audio output for providing a test audio signal to an external speaker and a microphone input for receiving a microphone signal from an external microphone. The receiver 101 may accordingly generate and output a test signal and analyze the resulting microphone signal to generate an acoustic room response in accordance with any suitable approach.

In other embodiments, the acoustic room response may for example be provided from an external unit or retrieved from a local or remote store.

The receiver 101 is coupled to a peak detector 103 which is arranged to detect a set of peaks in the acoustic room response in a frequency interval having an upper frequency of no more than 400 Hz, and in many embodiments no more than 300 Hz, 200 Hz or in some embodiments even 100 Hz.

It will be appreciated that many different peak detection techniques and algorithms are known and that any suitable technique can be used without detracting from the invention. For example, the peak detector may first apply a low pass filtering and then detect all the local maxima under 400 Hz. The set of peaks may then be generated as the frequencies of these local maxima. In other examples, a fixed number of peak frequencies may be selected, such as the frequencies of the largest, say, ten or twenty peaks.

The set of peaks thus provide a parameterization of characteristics of the acoustic room response and thus the room, and can be seen as a signature or fingerprint of the acoustic room response. However, the set of peaks is not just a parameterization of the acoustic room response, but rather is specifically selected to provide a strong correlation with the Eigen modes and Eigenfrequencies of the room, and thus is selected to have a particularly strong correlation with the physical dimensions of the room. For brevity and clarity, the set of peaks (peak frequencies) extracted from the acoustic room response will be referred to as the peak signature (of the acoustic room response or room).

The peak detector 103 is coupled to an estimator 105 which is further coupled to a memory or store 107 which stores a database of peak profiles and associated room dimension data.

Specifically, the database comprises a plurality of data sets where each data set comprises a peak profile corresponding to an acoustic room response for a different (real or virtual/calculated) room together with room dimensions for that room. Thus, each data set comprises the peak profile and associated room dimension data. The peak profile provides a representation of peaks (and specifically peak frequencies) in a room response and the associated room dimension data provides an indication of the dimensions of that room. The associated room dimension data may for example indicate the length, width and height of the room having the acoustic room response represented by the peak profile. Thus, the peak profile can also be considered to be a signature or fingerprint of an acoustic room response.

The data base may in some embodiments also include a representation of the acoustic room response but will typically only include the parameterized representation provided by the peak profile. A particular advantage of the current approach is that only a peak profile needs to be stored rather than the acoustic room response itself. This may substantially reduce the storage requirements as well as the computational requirements.

Typically, the database will include data sets for a large range of different rooms. This may include data sets for a large number of rooms with different dimensions but may also include different data sets for rooms with the same dimensions. For example, data sets may be stored for rooms of the same dimension but with different acoustic characteristics, such as for an empty echoic room, a room of the same dimensions but with furniture and less echoic etc.

In addition to the peak profile, the data set for each acoustic room response comprises room dimension data for the room corresponding to the acoustic room response. The room dimension data may specifically comprise one-dimensional distances, such as the width, length and height of the room.

In some embodiments, the data set may comprise additional information for each room. For example, in some embodiments, each data set may also contain additional acoustic information, such as an indication of how reverberant the room is (which e.g. may be reflected in the amplitudes of the peaks). Such additional information may e.g. be used by a system rendering audio based on the generated estimates.

The estimator 105 is arranged to determine the room dimension estimate based on a comparison of the set of peaks to the set of peak profiles and the associated room dimension data stored for the peak profiles. Thus, the estimator 105 may compare the peak signature of the current room to the stored peak profiles and evaluate the room dimension data for the stored peak profiles based on this comparison. The room dimension data for the peak profiles which closely match the peak signature can be weighted higher than the room dimension data for the peak profiles that match the peak signature of the current room less well.

In the following, an example of how the estimator 105 may generate a room dimension estimate will be described. In the example, an efficient search method is used to determine the most likely room size that corresponds to the set of detected peak frequencies, i.e. to the peak signature. The search method is based on comparing the detected peak signature/spectrum to the peak profiles of the database, and using a suitable error criterion to determine a set of matching peak profiles/candidate rooms. The room dimension estimate is then generated from the stored room dimensions of these matching peak profiles/candidate rooms. Specifically, a single matching peak profile/matching room may be identified and the room estimate may be set as the stored room dimensions for this peak profile.

It will be appreciated that in other embodiments, the estimator 105 may use other approaches for generating the room dimension estimate based on the comparisons and the stored room dimension data.

Figure 2:
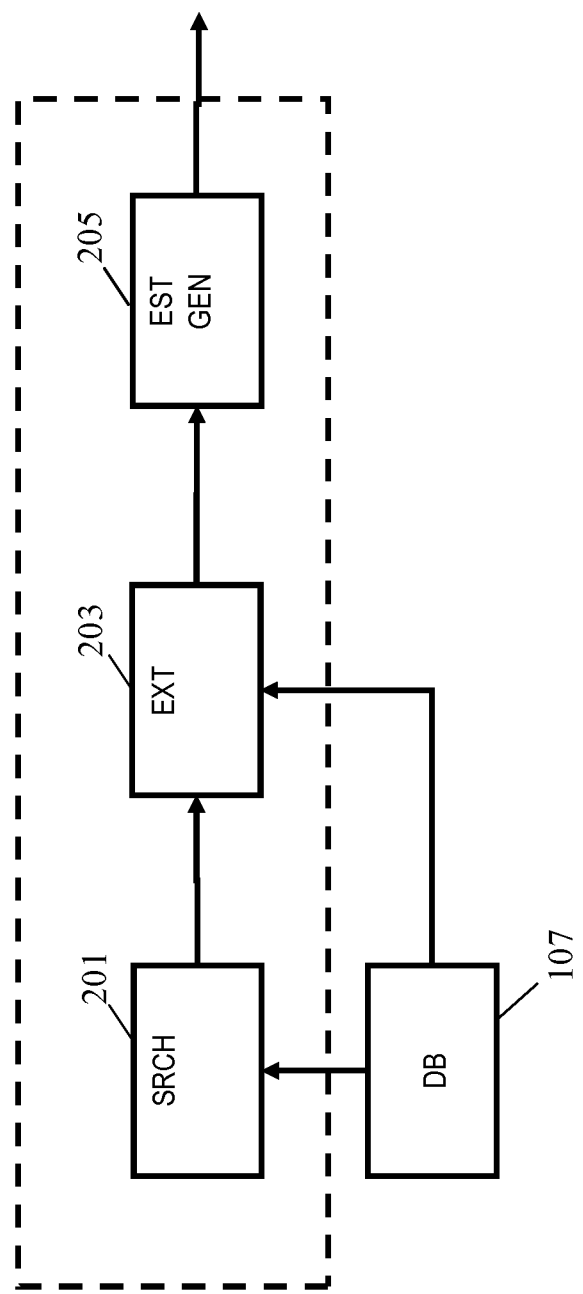
FIG. 2 illustrates an example of elements of an estimator for an apparatus for determining a room dimension estimate in accordance with some embodiments of the invention.

FIG. 2 illustrates an example of elements of the estimator 105 in accordance with some embodiments.

In the example, the estimator 105 comprises a searcher 201 which is coupled to the store 107 comprising the database. The searcher 201 is arranged to find a matching peak profile in the database for the peak signature generated from the acoustic room response.

The searcher 201 is coupled to an extractor 203 which is also coupled to the store 107 and which is arranged to extract room dimension data associated with the matching peak profile from the data base. Thus, once the searcher 201 has identified one or more matching profiles in the data base, the extractor 203 extracts the room dimension data stored in these data sets.

The extractor 203 is coupled to an estimate generator 205 which is arranged to determine the room dimension estimate in response to the extracted room dimension data.

The approach will be described with reference to the specific example wherein the peak signature is represented by a set of frequencies of the peaks in the low frequency interval of the acoustic room response. Thus, the peak signature may simply be represented by a set of frequency values being the frequencies of the peaks detected by the peak detector 103.

Similarly, each of the peak profiles comprises a set of frequencies of peaks. Thus, each data set comprises a set of frequency values corresponding to peaks in the acoustic room response determined (whether measured or calculated) for the room represented by the data set.

Thus, both the peak signature and the peak profiles characterize the corresponding acoustic room response by a number of frequency values corresponding to peaks in a low frequency interval. In an ideal case with no noise, these frequencies would correspond to the Eigenfrequencies of the room and thus would provide a particularly efficient basis for finding matching acoustic room responses corresponding to matching rooms.

In the example, the searcher 201 determines a distance measure for each peak profile based on a comparison of the frequencies of the peak signature and the frequencies of the individual peak profile. For example, for each frequency value of the peak signature, the searcher 201 may determine the frequency offset to the nearest frequency value of the peak profile. This may be repeated for all frequencies of the peak signature, and the frequency offsets or errors may be summed to provide an overall distance (or error) measure for the peak profile. In this way, the searcher 201 may generate a single distance measure for each peak profile.

The searcher 201 may then proceed to identify the peak profile resulting in the lowest distance measure, and this peak profile can be selected as the matching profile and fed to the extractor 203 which proceeds to extract the room dimension data of the corresponding data set. The data is then fed to the estimate generator 205 which generates the dimension estimate, e.g. by simply using the retrieved room dimension data directly.

In many scenarios, it may be advantageous for at least some of the peak profiles to be calculated Eigen profiles rather than being based on measured acoustic room responses. Thus, in some embodiments at least some of the peak profiles may comprise a set of Eigenfrequencies calculated for a room. The associated room dimension data may comprise an indication of dimensions for the room used to calculate the Eigenfrequencies. This may provide a more accurate comparison in many scenarios as it may reduce the impact of noise, measurement uncertainty etc. Indeed, it may be considered that the comparison seeks to compare the underlying Eigenfrequency modes at low frequencies and that the peak detection and processing can be seen as an estimation of these modes. Therefore, directly representing the underlying Eigenfrequency modes rather than estimates thereof in the peak profiles may provide improved estimation.

In the following, the specific example will be described in more detail.

In the example, the first phase of the search procedure is to define a search space of possible room sizes. The search algorithm of the example is based on searching a database of possible room size candidates for the one that is most likely to correspond to the detected set of peaks. This means the scope of the database may be or often has to be restricted to a certain range of room sizes. This is done by defining a minimum and maximum size for each room dimension. Also, for each dimension a step-size is defined, which will determine the minimum difference in size that can be detected for this dimension. Having defined the range and step-size for each dimension, a discrete search space of rooms that will be considered as candidates by the algorithm is defined.

The next step is to calculate the discrete set of Eigenfrequencies corresponding to each of the rooms in the search space, for example using equation (1). Since only the Eigenfrequencies in the low-frequency range (where the Eigenfrequencies may be detected individually) are of interest, only the Eigenfrequencies up to a certain frequency have to be included. For example, for a typically-sized living room it may be sufficient to include the Eigenfrequencies up to about 100 Hz, of which there may typically be about 20.

The resulting collection of candidate rooms and their corresponding sets of Eigenfrequencies form the database that is searched by the algorithm.

It should be noted that in this description, the generation of the data base is performed as part of the search. However, it will be appreciated that in many embodiments, the data base may be populated prior to the search. For example, it may be pre-computed during a design and/or manufacturing stage, and stored as a look-up table in the apparatus. It will also be appreciated that the data base may be dynamically modified e.g. by adding additional peak profiles when considered appropriate (e.g. when a search is performed over a new range of possible dimensions).

In the example, the searcher 201 calculates an error or distance measure for each of the candidate rooms in the search space (i.e. for each peak profile), using a distance metric reflecting the difference between the set of detected peak frequencies and the set of Eigenfrequencies of the candidate room (i.e. between the frequencies of the peak signature and of the peak profile).

One specific implementation is as follows. For a candidate room l (out of a total of L rooms) and a detected peak frequency m (out of a total of M frequencies) from the measured acoustic room response of the room to be estimated, the Eigenfrequency n from the set (with a total number of N) corresponding to peak profile/room l is found that has the smallest distance (in frequency) $d_{lm}$ to the detected peak m. This is done for all M detected peak frequencies of the peak signature and the resulting M distances $d_{lm}$ are summed to give the overall error measure $D_l$ for peak profile/room l. This distance measure is calculated for all L candidate peak profiles/rooms. The peak profile, and thus room candidate, which has the lowest overall error measure $D_l$ is now concluded to be the most likely one to correspond to the real room geometry, since it has the best overall match to the measured peak frequencies.

The error measure may e.g. be computed as:

$$D_l = \sum_{m=1}^{M} w_{1,m} d_{lm}, \quad d_{lm} = \min_n (w_{2,n} | f_{meas,m} - f_{eigen,n} |), \quad (4)$$

where $f_{meas}$ refers to the set of M measured peak frequencies of the peak signature and $f_{eigen}$ is the set of N Eigenfrequencies of peak profile l (i.e. room candidate l).

In this example, the distance measure includes two weighting factors $w_1$ and $w_2$ that can be used to refine the search. The weight factors may in many embodiments simply be set to one.

The peak profile resulting in the lowest distance measure can be identified and the room dimensions stored for this peak profile/room candidate can be used as the room dimension estimate for the current room. E.g. the width, length and height stored for the matching peak profile can be output as an estimate of the width, length and height of the current room.

Alternatively to directly concluding that the single room candidate with the overall lowest value of the distance measure is the correct one, other strategies may be advantageous. While for simulated rooms, it is true that the candidate room that corresponds to the modeled room indeed often has the lowest overall error value, this may not always be the case for real-life rooms. It may for various reasons happen that there are multiple (clusters of) candidate rooms that are quite distinct in geometry, but which have similar overall distance values. This may result in incorrect identification of the most appropriate room candidate if the algorithm simply selects the candidate room with the lowest calculated distance measure.

In some embodiments, the searcher 201 may e.g. identify a plurality of matching peak profiles (e.g. all those for which the distance measure is below a given threshold) and the extractor 203 may extract the room dimensions data for all of the matching peak profiles. The estimate generator 205 may then combine the extracted data to generate the dimension estimate. For example, an estimate of the length of a room may be generated by averaging the lengths stored for the matching peak profiles, an estimate of the width may be generated by averaging the widths stored for the matching peak profiles, and an estimate of the height may be generated by averaging the heights stored for the matching peak profiles.

In some embodiments, the averaging may be a weighted averaging wherein the weight of each extracted dimension is weighted dependent on the generated distance measure for the corresponding peak profile.

Another approach that has been found to significantly improve reliability of the estimates in a number of scenarios, where the room estimates include a plurality of one dimensional values corresponding to different directions (e.g. width, length and height), is to determine averaged match indications (such as a distance measure, an error measure, or a likelihood measure) for a subset of the directions in response to an averaging (e.g. a weighted averaging) of match indications for the peak profiles in one or more directions that are not in the subset. The dimension estimate for the directions in the subset can then be determined using the averaged match indications.

The approach may e.g. average distance measures for different peak profiles over individual directions. For example, when identifying which peak profile provides the best match for determining the width and length of a room, the distance measure may be generated by averaging all peak profiles that have the same width and length, i.e. by averaging the distance measures over all possible heights of the room. In particular, if peak profiles are provided with different measures in three dimensions, a three dimensional distance measure matrix is generated by calculating the distance measure for each peak profile. In this case, all distance measures may be summed or averaged over a $3^{rd}$ dimension of the matrix, thereby generating a two dimensional matrix of distance measures. The resulting lowest distance measure can then be selected in this two dimensional matrix. This may essentially be considered to reduce the estimation to a two dimensional estimation. In some embodiments, the reduction may be to a single dimension, i.e. averaging over the second dimension may also be performed. The approach may be applied in parallel to the different dimensions, thereby still allowing a three dimensional estimate to be generated. The approach has experimentally been found to provide improved performance in many scenarios.

In some embodiments, the peak profiles may comprise a set of probability values where each probability value indicates a probability of a peak being measured in a frequency interval. Thus, rather than indicate the frequencies of the Eigen modes, the low frequency range may be divided into relatively small frequency intervals with a probability value being provided for each interval. This may provide a more spread-out or smeared representation of the underlying Eigen modes and this may in many scenarios provide a more robust search.

In such embodiments, the searcher 201 may instead of generating a distance measure for each peak profile determine a likelihood measure indicative of the likelihood of the frequencies of the peak signature resulting from a room corresponding to that represented by the individual peak profile.

The likelihood value may e.g. be calculated by, for each frequency of the peak signature, extracting the probability value for the corresponding frequency interval and then multiplying the extracted probability values. The estimator 105 may proceed to use the same approaches as previously described but using the likelihood measure instead of the distance measure.

Thus, in some embodiments, the estimator 105 may use a search approach based on probabilities rather than on a distance metric-based error measure. In this case, the database may instead of comprising peak profiles represented by a set of Eigenfrequencies corresponding to each candidate room from the search space comprise peak profiles represented by a "probability vector" that, for each of K frequency bands, contains the probability that a peak within that frequency band will be detected in the measured room response of a room corresponding to that candidate room. These probabilities can again be based principally on the set of Eigenfrequencies corresponding to each room candidate according to equation (1). A probability distribution can be applied to the Eigenfrequencies which may include, for example, aspects relating to the frequency resolution of the measurement set-up, small differences between the "theoretical" and real-life Eigenfrequencies of the room due to small deviations between the theoretical room model (which may be an empty rectangular box with hard walls) and the actual room situation (which may not be strictly rectangular and include all kinds of objects and some absorption).

From the probabilities of the individual detected peaks, an overall probability is calculated which provides an indication of the likelihood that the detected peaks correspond to a certain candidate room. This calculation of the overall probability may treat the peak probabilities as independent (implying that the individual probabilities can simply be multiplied), or may take into account some interdependency (e.g. the presence of a peak at frequency f increases the probability of detecting a peak at multiples of the frequency as well).

A particular advantage of the approach is that it may provide estimates which do not just reflect the overall size or volume of the room but rather allows the individual dimensions to be estimated, and in particular allows the individual length, width and height to be estimated.

In the above specific examples, the estimator 105 specifically performs a search to identify a subset, and possibly only a single, of the peak profiles. The estimate is then generated from the selected subset. However, it will be appreciated that it is not essential that a search is performed or that a subset is selected.

For example, in some embodiments the estimator 105 may generate the estimates by combining the room dimension data of the different data sets, where the weight of the individual room dimension data depends on how closely the corresponding peak profile matches the peak signature.

Specifically, the estimator 105 may generate a match indication for each peak profile. For example, the distance measure previously described may be used as a match indication. The distance measure may then be used, e.g. to perform a weighted averaging of the room dimensions. For example, an estimate of the width of a room may be generated by a weighted averaging of all width measures stored with the peak profiles, where the weight for each width is determined by the distance measure. Typically, the weights may be a non-linear function of the distance measure such that high distance measures will result in weights that are substantially zero.

In some embodiments, the room dimension estimate may be based on a plurality of acoustic room responses, and specifically it may be based on acoustic room responses measured for different positions of the sound source and/or the microphone. For example, a test signal may be rendered by a speaker and a microphone may capture the signal with the acoustic room response being generated therefrom. The microphone (or the speaker) may then be moved and the measurement repeated, resulting in a new acoustic room response. The approach may possibly be repeated more times.

The plurality of acoustic room responses may be used to generate the room dimension estimate and accordingly a combination of data for the different acoustic room responses is included at some stage in the processing.

In some embodiments, the combination may be an averaging (low pass filtering).

The averaging may for example be performed already by averaging the acoustic room responses to generate an averaged acoustic room response which is then used in the same way as described previously for a single acoustic room response. Thus, the peak detection may be applied to the averaged acoustic room response and the resulting peak signature may be used.

However, in other embodiments, the averaging may be performed at other stages of the processing. For example, peak detection may be applied individually to each acoustic room response to generate a plurality of peak signatures. A comparison may then be performed for each of these and the result of the comparisons may be averaged. For example, a distance measure may be calculated for each peak signature and for each of the peak profiles. The resulting distance measures may then be averaged for each peak profile, and the matching peak profile may be selected as the one having the lowest averaged distance measure.

In some embodiments, the averaging may be of room dimension estimates determined for different acoustic room responses. For example, the approaches described above for a single acoustic room response may be applied to each acoustic room response of the plurality of acoustic room responses. The resulting room dimension estimates may then be averaged to generate the output estimates. E.g. all the length estimates may be averaged to generate a single length estimate.

Thus, in many embodiments, the estimation may advantageously be based on measurements of a plurality of acoustic room response using multiple source- and/or receiver positions for the measurements.

In some embodiments, the combination may comprise generating a peak signature by including peaks from a plurality of acoustic room responses.

As can be seen from equations (2) and (3), the extent to which each of the room's Eigen modes is excited depends on the position of the sound source. Similarly, the resulting sound pressure due to each Eigen mode depends on the receiver position. Accordingly, the combination of source- and listening position together determines which of the room's low-frequency modes will actually be visible in the measured room response. For some combinations, it may be possible to detect all of the relevant modes from a single measurement, while for others only a few peaks will be detected from a single measurement.

By combining the detected peaks resulting from peak detection applied to acoustic room responses for two or more source- and/or receiver positions, the results of the method can be improved. A two-fold improvement is obtained. First, by combining the peaks from multiple source/receiver combinations, a more complete set of peaks can be obtained, as one position will provide peaks that are invisible at another position, and vice-versa. Combining the peaks from multiple source/receiver position combinations will reduce the chance of mis-identification due to an incomplete set of peaks being available to the search algorithm. Secondly, peaks that are detected in the response of more than one source/receiver position combination can be considered as being more reliable than peaks that are only detected in one of the responses. A way to exploit this is to feed the total set of combined peaks, so including doubles that occur in multiple source/receiver position combinations, to the search algorithm, which, by doing so, effectively attributes more weight to the peaks that are detected multiple times.

In principle it doesn't matter whether multiple source positions, multiple receiver positions, or both are used, as source- and receiver positions are interchangeable (reciprocity principle of acoustics).

In some embodiments, the system may have one microphone at a fixed position, e.g. integrated in some main unit of the system, and multiple speakers. In this case, the number of responses that can be obtained is equal to the number of speakers.

In other embodiments, a microphone may be integrated into each loudspeaker enclosure, and measurements may be performed between all pairs of loudspeakers and microphones, or a sub-set of all these pairs. For a system with N loudspeakers there are $N(N+1)/2$ pairs in total, including those with loudspeaker and microphone in the same enclosure.

An especially interesting case is when the source and/or receiver is positioned in a corner. From equation (3) it can be seen that, in theory, a source that is placed in a corner should excite all of the room modes with maximum strength. Similarly, a microphone that is placed in a corner should produce a signal that shows all the modal frequencies that are being excited by the source. This means that if the use-case allows the source and/or receiver to be placed in a corner, this should enable a very complete set of peaks to be obtained from only very few measurements. In the special case in which both source and receiver are placed in a corner (either the same corner or different ones), a single measurement should in principle provide the complete set of Eigenfrequencies.

In some embodiments, the estimator 105 may be arranged to weigh different peaks of the set of peaks differently. For example, the peaks may be weighted differently depending on the peak frequency, or depending on the amplitude for the peak, or based on a reliability measure generated by the peak detection. This may for example be done by varying the weights $w_1$ of equation (4) in dependence on these factors.

In some embodiments, the estimator 105 may be arranged to weigh different peaks of a peak profile differently when performing the comparison, such as e.g. when determining the distance measure. For example, the distance measure may be weighted differently depending on the type of room. This may for example be done by varying the weights $w_2$ of equation (4).

Indeed, although the distance measure of equation (4) yields good estimates in many scenarios without changing the weights $w_1$ and $w_2$ (i.e. with $w_1=1$ and $w_2=1$), the results may in other scenarios be significantly improved by employing varying weights.

The effect of varying weight $w_1$ is to put more emphasis on some detected peaks than on others. One sensible option is to make $w_1$ a function of frequency, with the weight decreasing for increasing frequency. The rationale behind this is that since the density of Eigenfrequencies increases for increasing frequency, higher peak frequencies are less characteristic of a specific room size than lower peak frequencies.

The effect of weight $w_2$ is to give more importance to certain Eigenfrequencies from the set corresponding to a certain candidate room than to others. As with $w_1$, this could be made a function of frequency in a similar way. Another possibility is to make $w_2$ dependent on the type of mode.

In a three dimensional room, three different types of modes exist: axial, tangential and oblique modes. Axial modes are modes in which the pressure variations are oriented along a single dimension, while the pressure is constant along the other two dimensions. Tangential modes have pressure variations in two dimensions, while oblique modes involve all three dimensions. An analysis of the distribution of the different types of modes in a room and their prominence in the (modeled or measured) acoustic room response reveals that axial modes and low-order tangential modes are more likely to clearly stand out in the acoustic room response than oblique or higher-order tangential modes. As a result, a peak that is detected in a measured room response is more likely to correspond to an axial or low-order tangential mode than to another mode type. This can be accounted for by assigning different weights $w_2$ to the different types of modes, such that axial- and low-order tangential modes have a higher chance of being selected as the closest match to a detected peak frequency, than other mode types.

In some embodiments the estimator 105 is arranged to select a subset of the set of peak profiles to use in response to a user input indicating a room dimension value. Thus, a range of candidate rooms/peak profiles may be selected and only these will be used in the comparison and search. The user may for example indicate a rough dimension, and the system may generate a range which includes this dimension. In other embodiments, the user may directly specify the range e.g. of the length, width and height for possible candidate rooms.

In some embodiments, external information that may be helpful to identify the correct room dimensions can be utilized by the estimator 105, and especially can be used to make the search more reliable. The external information may consist of "physical" data such as known positions of loudspeakers and/or microphones relative to each other, one or more of the room's dimensions being known to be within a certain range, room acoustical parameters such as reverberation time, etc.

The external information may in some embodiments consist of "heuristic" data, such as statistics about how common a certain room dimension ratio is in real-life.

The external information may be used to select a subset of peak profiles thereby reducing the search space of candidate room sizes to only those that are in agreement with the external information. This will not only reduce the chance of mis-identification, but will also speed up the search procedure.

Alternatively or additionally, the external information may be used to differentiate between matching peak profiles resulting from a search. This may be particularly suitable when peak profiles are found which correspond to very different candidate rooms but which have similar distance or likelihood measures.

Inclusion of external information will be particularly beneficial in cases in which the set of measured peaks is rather incomplete (e.g. because only a single measurement position was used, or the measurement positions were such that only a few peaks were present in the responses), in which case ambiguity of room size can occur.

Simulations have been performed to evaluate the approach. In the simulations, the acoustic room response and peak profiles were modeled using the modal decomposition model according to equations (2) and (3).

Figure 3:
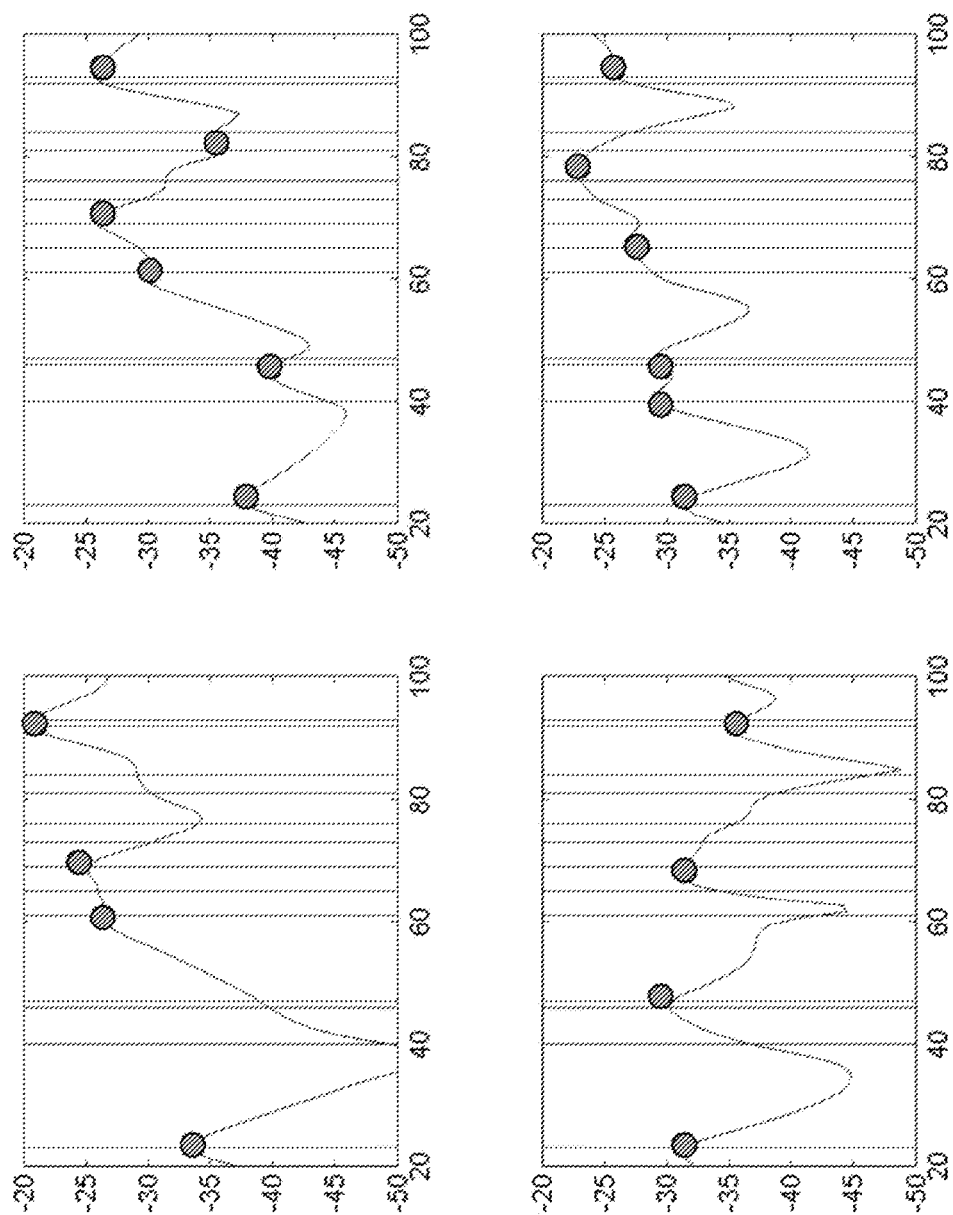
FIG. 3 illustrates an example of Eigenfrequencies and peaks of acoustic room responses.

The modeled room had dimensions of 7.4×4.2×2.8 m and an absorption coefficient of $\alpha=0.3$ (corresponding to approx. $\delta=20$ in equation (2)). FIG. 3 illustrates the acoustic room response of the modeled room at four randomly selected positions in the room. The Eigenfrequencies corresponding to axial- and tangential modes of the room are indicated by the vertical lines. Running a simple peak detection algorithm returned the peak frequencies indicated by the circles. As can be seen, each individual response of the four simulated responses only includes a subset of the full set of Eigenfrequencies. However, all peaks that are detected do belong to the set, and the four subsets are indeed partly complementary.

The detected peaks were input to a search algorithm using the distance measure of equation (4) with both weights $w_1$ and $w_2$ statically set to 1 and with the search limited to peak profiles corresponding to dimensions of 2.5 m to 8 m for the first two dimensions and between 2 and 4 m for the third dimension. The step size for the peak profiles was set to 0.1 m in all dimensions. The overall lowest distance measure was found for a geometry of 7.4×4.3×3.6 m, so two out of the three dimensions are accurate to within 0.1 m. However, if averaging of the distance measure is performed over the third dimension, the lowest distance measure is found for 7.4 and 4.2 m for the first two dimensions. Averaging the distance measure over the second dimension results in the lowest distance measure for 7.4 and 2.8 m for the first and third dimension respectively. Thus, in this case, accurate estimates are generated for all dimensions.

The approach has also been evaluated by practical experiments. Measurements have been obtained in a number of real rooms. As an example, a room of length 7.4 m and width 5.7 m, and furnished to be representative of a typical living room with thick carpet and curtains, several large cabinets against the walls, a large dining table and chairs, and many other large and small objects was used to test the approach.

Figure 4:
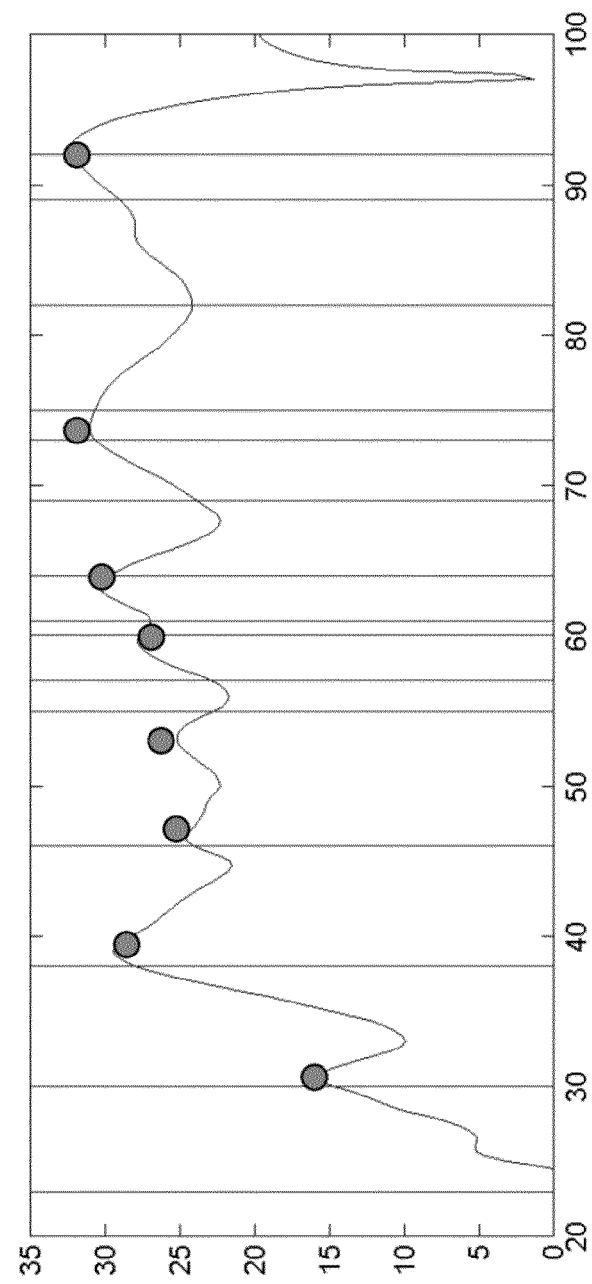
FIG. 4 illustrates an example of Eigenfrequencies and peaks of acoustic room responses.

Measurements were performed with four full-range loudspeakers distributed arbitrarily in the room. Each loudspeaker was provided with a microphone. Logarithmic sweep measurements were carried out between each pair of speakers to generate acoustic room responses. FIG. 4 illustrates an example of one measured room response after mild smoothing with a Gaussian window. From this smoothed response the peaks were detected. The detected peaks are indicated in FIG. 4 by circles. Also indicated by vertical lines are the theoretical axial- and tangential modal frequencies corresponding to the real room geometry. It can be seen that most of the detected peaks indeed do correspond well to the theoretically expected Eigenfrequencies.

The detected peak frequencies were fed to the search algorithm, which returned the correct room dimensions to an accuracy of within 0.1 m (the step-size used in the search algorithm). Similar results were obtained for other rooms.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:
1. An apparatus for determining a room dimension estimate, the apparatus comprising:
 a receiver configured to provide an acoustic room response;

a peak detector configured to detect a set of peaks in the acoustic room response in a frequency interval, the frequency interval having an upper frequency of no more than 400 Hz;

a store configured to store a set of peak profiles with associated room dimension data;

an estimator configured to determine the room dimension estimate in response to the associated room dimension data and a comparison in the frequency domain of the set of peaks to the set of peak profiles.

2. The apparatus of claim 1, wherein the estimator comprises:

a searcher configured to find at least one matching peak profile for the set of peaks from the set of peak profiles;

an extractor configured to extract first room dimension data associated with the at least one matching peak profile from the store; and an estimate generator configured to determine the room dimension estimate in response to the first room dimension data.

3. The apparatus of claim 2, wherein each peak profile comprises a set of frequencies of peaks.

4. The apparatus of claim 3, wherein the searcher is configured to determine a distance measure for each peak profile in response to a comparison of frequencies of the set of peaks and the set of frequencies of the peak profile; and configured to select the matching peak profile in response to the distance measures.

5. The apparatus of claim 2, wherein each peak profile comprises a set of probability values, each probability value indicating a probability of a peak being measured in a frequency interval.

6. The apparatus of claim 5, wherein the searcher is configured to determine a likelihood measure for each peak profile in response to the probability values of the peak profile and the frequencies of the set of peaks; and configured to select the matching peak profile in response to the likelihood measures.

7. The apparatus of claim 1, wherein each peak profile comprises a set of Eigenfrequencies calculated for a room and the associated room dimension data comprises an indication of dimensions for the room used to calculate the Eigenfrequencies.

8. The apparatus of claim 1, wherein the associated room dimension for at least some of the peak profiles comprises at least one one-dimensional value, and the estimator is configured to generate the room dimension estimate to comprise at least one one-dimensional value.

9. The apparatus of claim 1, wherein the estimator is arranged to generate a match indication for the set of peaks and each peak profile of the set of profiles; and to generate the dimension estimate by a weighted combination of the associated room dimension data; the weight for associated room dimension data for a first peak profile of the set of peak profiles depending on the match indication for the first peak profile.

10. The apparatus of claim 1, wherein the associated room dimension for at least some of the peak profiles comprises a plurality of one-dimensional values corresponding to different directions, and the estimator is arranged to determine averaged match indications for a subset of the directions in response to an averaging of match indications for the peak profiles over at least one direction not in the subset; and to determine one-dimensional room dimension estimates for the directions of the subset in response to the averaged match indications.

11. The apparatus of claim 1, wherein the receiver is configured to receive a plurality of acoustic room responses corresponding to different positions of at least one of a sound source and a microphone; and the apparatus is configured to perform a combination for the plurality of acoustic room responses.

12. The apparatus of claim 11, wherein the combination includes at least one of an averaging of comparisons between sets of peaks corresponding to different acoustic room responses and the set of peak profiles and an averaging of room dimension estimates determined for different acoustic room responses.

13. The apparatus of claim 11, wherein the combination comprises generating the set of peaks by including peaks from more than one of the plurality of acoustic room responses.

14. The apparatus of claim 1, wherein the estimator is arranged to weigh at least one of different peaks of the set of peaks and different peaks of a peak profile differently when performing the comparison.

15. A method of determining a room dimension estimate, the method comprising:

providing an acoustic room response;

detecting a set of peaks in the acoustic room response in a frequency interval, the frequency interval having an upper frequency of no more than 400 Hz;

providing a set of peak profiles with associated room dimension data; and determining the room dimension estimate in response to the associated room dimension data and a comparison in the frequency domain of the set of peaks to the set of peak profiles.

16. An apparatus for determining a room dimension estimate, the apparatus comprising:

a receiver configured to provide an acoustic room response;

a store configured to store a set of peak profiles with associated room dimension data;

a circuit operably coupled to the receiver and the store, the circuit configured to perform acts of:

detecting a set of peaks in the acoustic room response in a frequency interval received from the receiver, the frequency interval having an upper frequency of no more than 400 Hz;

determining the room dimension estimate in response to the associated room dimension data and a comparison in the frequency domain of the set of peaks to the set of peak profiles.

* * * * *